United States Patent
Rust et al.

(10) Patent No.: US 7,318,120 B2
(45) Date of Patent: *Jan. 8, 2008

(54) HARDWARE ASSISTED COMMUNICATION BETWEEN PROCESSORS

(75) Inventors: Robert A. Rust, Boise, ID (US);
Eugene M. Cohen, Eagle, ID (US);
Scott D. McLean, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

This patent is subject to a terminal disclaimer.

(21) Appl. No.: 11/023,091

(22) Filed: Dec. 24, 2004

(65) Prior Publication Data

US 2005/0120190 A1     Jun. 2, 2005

Related U.S. Application Data

(63) Continuation of application No. 10/199,654, filed on Jul. 19, 2002, now Pat. No. 6,938,124.

(51) Int. Cl.
| | |
|---|---|
| G06F 12/00 | (2006.01) |
| G06F 11/00 | (2006.01) |
| G06F 7/00 | (2006.01) |
| G06F 15/173 | (2006.01) |
| G06F 15/16 | (2006.01) |
| G06F 3/00 | (2006.01) |

(52) U.S. Cl. ............... 711/114; 711/162; 714/6; 714/7; 707/204; 709/238; 709/245; 709/250; 719/330

(58) Field of Classification Search ............ None
See application file for complete search history.

(56) References Cited

U.S. PATENT DOCUMENTS

| 5,416,918 | A | 5/1995 | Gleason et al. |
|---|---|---|---|
| 5,928,367 | A | 7/1999 | Nelson et al. |
| 6,134,630 | A | 10/2000 | McDonald et al. |
| 6,247,086 | B1 | 6/2001 | Allingham |
| 6,253,271 | B1 | 6/2001 | Ram et al. |
| 6,295,565 | B1 | 9/2001 | Lee |
| 6,295,571 | B1 | 9/2001 | Scardamalia et al. |
| 6,301,625 | B1 | 10/2001 | McDonald et al. |
| 6,356,979 | B1 | 3/2002 | Sicola et al. |
| 2003/0177187 | A1* | 9/2003 | Levine et al. ............... 709/205 |

FOREIGN PATENT DOCUMENTS

| EP | 0528538 A3 | 2/1993 |
|---|---|---|
| EP | 070978 A3 | 7/1995 |
| EP | 0709781 A3 | 7/1995 |
| EP | 0709782 A3 | 7/1995 |
| EP | 0717358 A1 | 7/1995 |
| EP | 0723223 A2 | 7/1996 |
| EP | 0967552 A2 | 12/1999 |
| GB | 2313678 A | 3/1997 |

* cited by examiner

*Primary Examiner*—Reginald Bragdon
*Assistant Examiner*—Mehdi Namazi

(57) ABSTRACT

A method and apparatus performs hardware assisted communication between processors. In response to direction from a first processor, a first coprocessor writes information in a first block of mirrored memory. Mirrored memory is maintained, allowing a second coprocessor to read the information from a second block of mirrored memory. The information is saved in memory accessible to a second processor. The information is accessed by the second processor.

12 Claims, 6 Drawing Sheets

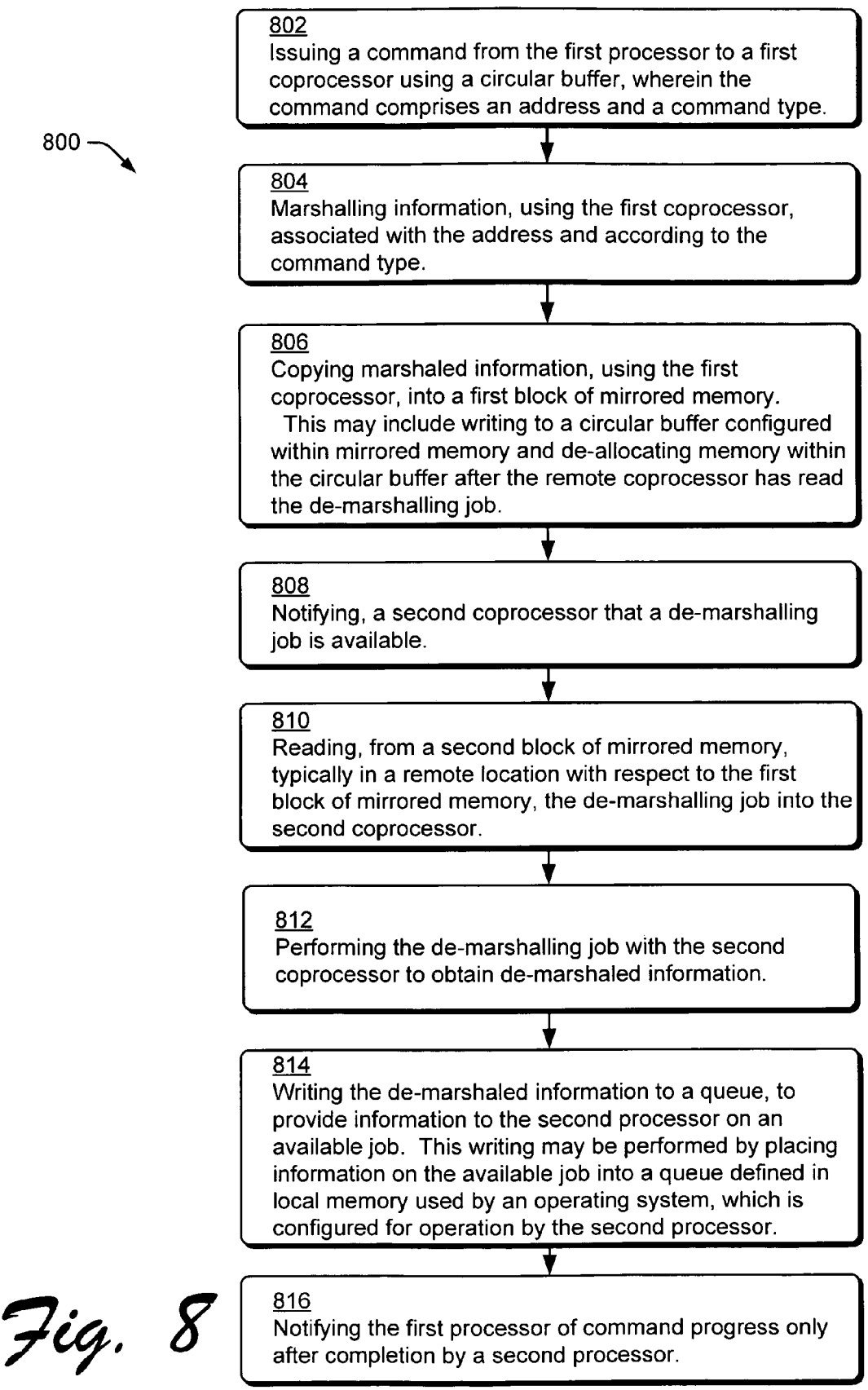

HARDWARE ASSISTED COMMUNICATION BETWEEN PROCESSORS

RELATED APPLICATIONS

This patent application is a continuation of, and claims priority to, U.S. patent application Ser. No. 10/199,654, now U.S. Pat. No. 6,938,124 B2, titled "Hardware Assisted Communication between Processors", filed on Jul. 19, 2002, commonly assigned herewith, and hereby incorporated by reference.

TECHNICAL FIELD

This disclosure relates to a RAID (redundant array of inexpensive disks) device having hardware assisted communication between processors.

BACKGROUND

RAID (redundant array of inexpensive disks) devices are increasingly employed to fill an ever-increasing need for mass data storage. Within a RAID device, operation of a large number of disks conventionally requires a large number of controller cards, each having at least one processor. One of the common issues associated with multiprocessor applications is the performance impact associated with having processors spend time transferring work from a first processor to a second processor.

In systems built around the concept of symmetric multi-processing (SMP), all processors see the same view of memory. In SMP systems, processors do not need to spend time packing up memory contents in the form of a message to another processor. However, special hardware elements are added to the SMP systems to track each processor's state and to insure that the memory stays coherent. As a result, these systems are very expensive and difficult to build. Additionally, SMP systems become increasingly complex, expensive and inefficient as processors are added. For example, difficulties associated with two or four processors are not nearly as complex as those systems with eight or more processors. Accordingly, SMP technology encounters system wide bottlenecks associated with coherency operations, and reduction of the overall benefit realized larger numbers of processors are added to the system. Therefore, multiprocessor systems that allow all processors to have the same view of memory may be complex and expense. Moreover, these drawbacks may increase with the number of processors.

In another form of multiprocessor architecture, cooperating processors do not share a common view of memory. For example, in a UNIX environment, messages are constructed and transmitted between processors in the form of "remote shells." In order for this to be of benefit to the overall performance, the messages need to be small and quickly constructed, but need to imply a large quantity of work. The quantity of work that is transferred must be much more than the work required formulating the message. For systems built according to this technology to succeed, care must be taken to prevent overhead involved in message formulation from degrading the benefit of employing another processor.

SUMMARY

A method and apparatus performs hardware assisted communication between processors. In response to direction from a first processor, a first coprocessor writes information in a first block of mirrored memory. Mirrored memory is maintained, allowing a second coprocessor to read the information from a second block of mirrored memory. The information is saved in memory accessible to a second processor. The information is accessed by the second processor.

BRIEF DESCRIPTION OF THE DRAWINGS

The same reference numbers are used throughout the drawings to reference like features and components.

FIG. 8 is a flow diagram that describes a method by which work may be shared between remotely located first and second processors within a RAID environment.

DETAILED DESCRIPTION

A method and apparatus performs hardware assisted communication between processors. In response to direction from a first processor, a first coprocessor writes information in a first block of mirrored memory. Mirrored memory is maintained, allowing a second coprocessor to read the information from a second block of mirrored memory. The information is saved in memory accessible to a second processor. The information is accessed by the second processor.

Figure 1:
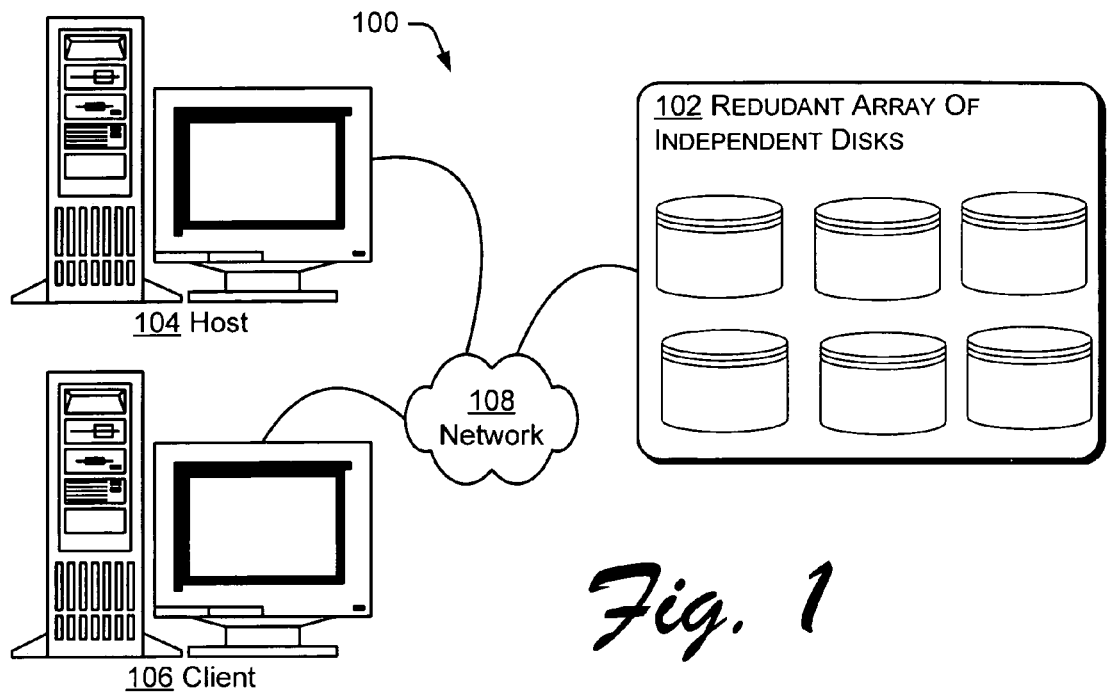
FIG. 1 is an illustration of an environment within which a RAID device having hardware assisted inter-processor communication is implemented.

FIG. 1 shows an environment 100 within which a RAID (redundant array of inexpensive disks) device 102 supported by a host 104 services a client 106 over a network 108. The RAID device employs an architecture wherein hardware assisted inter-processor communication enables a plurality of processors to more efficiently cooperate.

Figure 2:
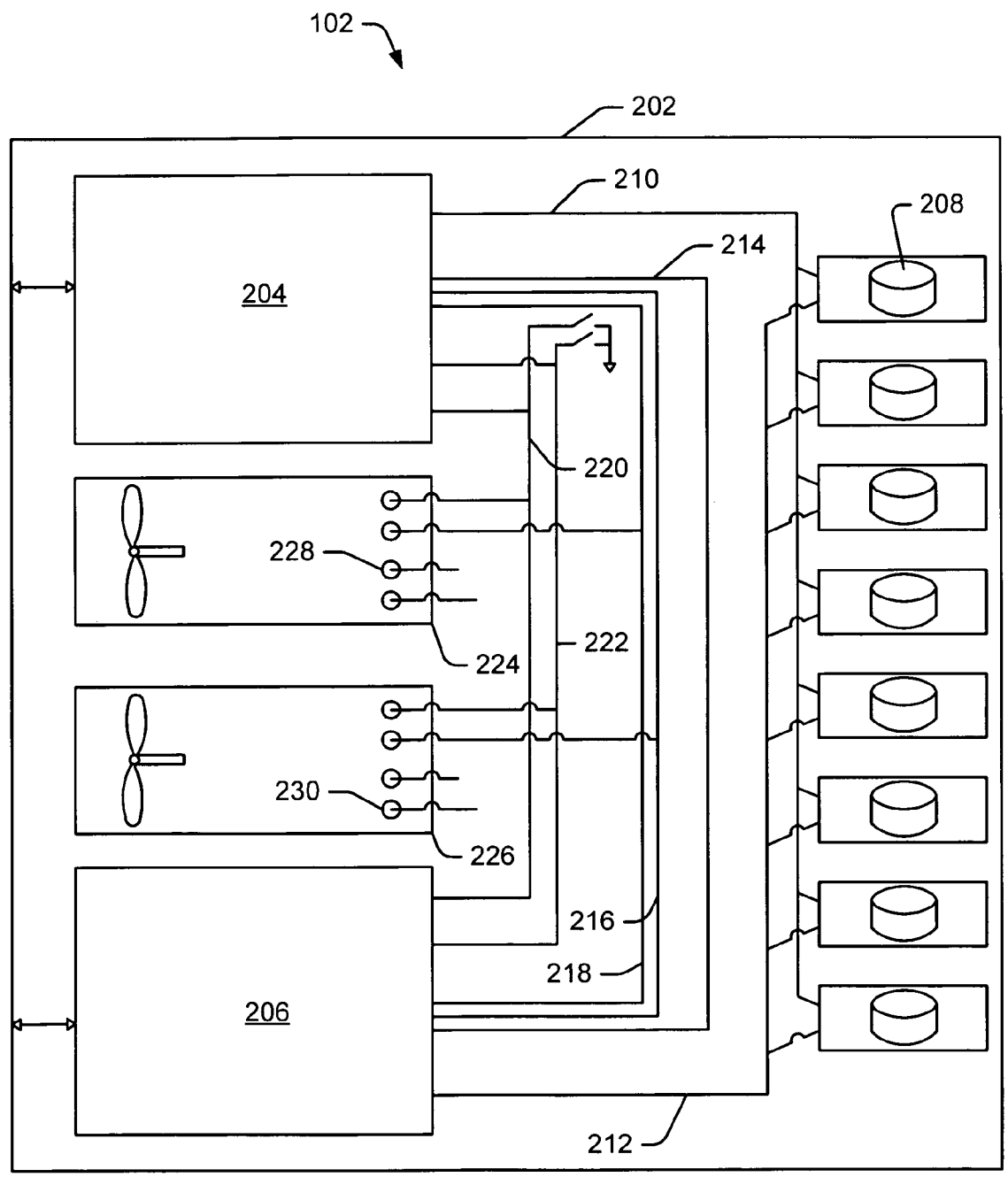
FIG. 2 is a block diagram illustrating additional detail in an exemplary RAID device.

FIG. 2 shows additional detail within the enclosure 202 of an exemplary RAID device 102. First and second controller cards 204, 206 control the operation of a plurality of disk drives 208 using Fibre Channel or similar technology information conductors 210, 212. As will be seen in additional detail in FIG. 3, a mirror bus 214 and additional communication busses 216, 218 allow an array ASIC contained within each controller card to maintain mirrored memory, also contained within the controller card. On-off control and power switching lines 220, 222 allow control over the operation of the RAID device. Power and cooling modules 224, 226 supply 5-volts 228 and 12-volts 230 to devices within the enclosure of the RAID device.

Figure 3:
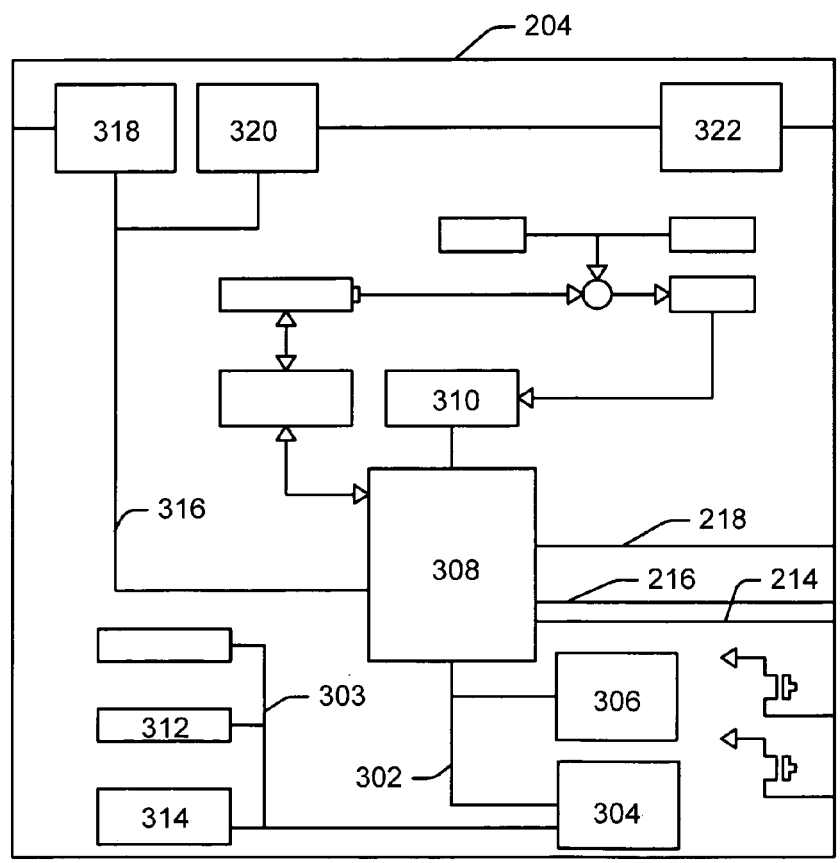
FIG. 3 is an expanded block diagram illustrating additional detail in a controller card present in the RAID device.

FIG. 3 is a further expanded block diagram illustrating additional detail in a controller card 204 present in the RAID device. While certain technologies are identified with certain components seen in FIG. 3, such as bus and memory technology, alternative components and technologies could, in many circumstances, be substituted.

A PCI bus 302 facilitates communication between a processor 304, a coprocessor 306, and an array ASIC 308. The array ASIC 308 additionally communicates with mirrored memory 310. A further bus 303 facilitates communication between the processor 304, flash memory 312 and local memory 314.

A number of different devices can be utilized to provide the coprocessor functionality, such as an ASIC (application specific integrated circuit) or a field programmable gate array (FPGA). Mirrored memory can utilize NVRAM (nonvolatile RAM) technology. Local memory 314 may utilize ECC SDRAM (error correcting code synchronous dynamic RAM).

The array ASIC 308 communicates with similarly situated array ASICs located in other controller cards by means of a mirror bus 214 and communication busses 216, 218. A PCI bus 316 allows the array ASIC to communicate with Fibre Channel I/O processors 318, 320, which communicate with host computers (such as host 104 of FIG. 1) and a Fibre Channel port bypass 322, which communicates with the disks 208 (as seen in FIG. 2).

Because the array ASICs 308 can communicate with similarly situated array ASICs located on other controller cards, the array ASICs are able to maintain mirrored memory. Maintaining mirrored memory involves making the changes made to any block of mirrored memory 310 to all other blocks of mirrored memory 310. Typically, the array ASIC 308 associated with one block of mirrored memory realizes that a change has been made to mirrored memory (such as by the array ASIC itself), and communicates that change to other array ASICs, each associated with another block of mirrored memory. The other array ASICs then make that change in their respective blocks of mirrored memory. Accordingly, mirrored memory, which comprises a plurality of blocks of mirrored memory, is maintained.

Figure 4:
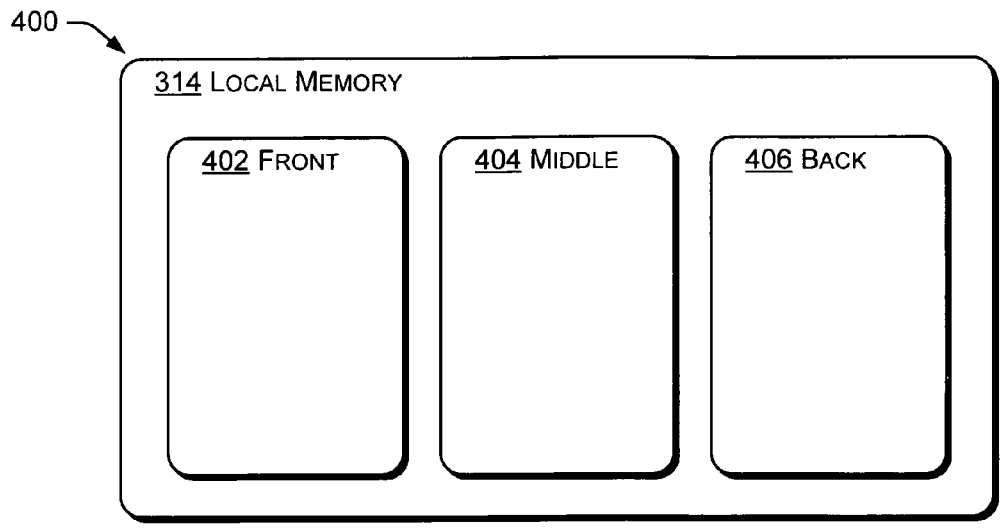
FIG. 4 is a block diagram illustrating software structures executed by a processor on the controller card.

FIG. 4 is a block diagram 400 illustrating exemplary software structures contained in local memory 314, and executed by the processor 304 of FIG. 3 on the controller card. In a RAID environment, the processor 304 receives information from an I/O processor 318. Such I/O messages may be initiated by a remote client, who sends a request to a host computer, which is in communication with the RAID device. Frequently, the front software 402, operating on the processor 304, will identify the I/O request as being associated with information on a disk which is associated with another controller card within the RAID device. Accordingly, the front software 402 will package the I/O request and send it to the appropriate processor, on the appropriate controller card, within the RAID device. Thus, when a host computer receives an I/O request from a client computer, the host sends the I/O request to a convenient controller card within the RAID device. The receiving controller card uses the front software 402 to redirect the I/O request to the correct controller card.

Middle software 404 performs tasks related to the operation of the RAID device, such as handling RAID stripes (i.e. distributing related data in segments over a plurality of disks, so that segments can be read from or written to simultaneously) and dealing with the task of rebuilding lost data from mirrored disks.

The back software 406 handles the lower level reading and writing tasks. For example, the back software supports the implementation of tasks such as going to a particular sector of a particular disk, reading data, and putting that data in a particular memory location.

Figure 5:
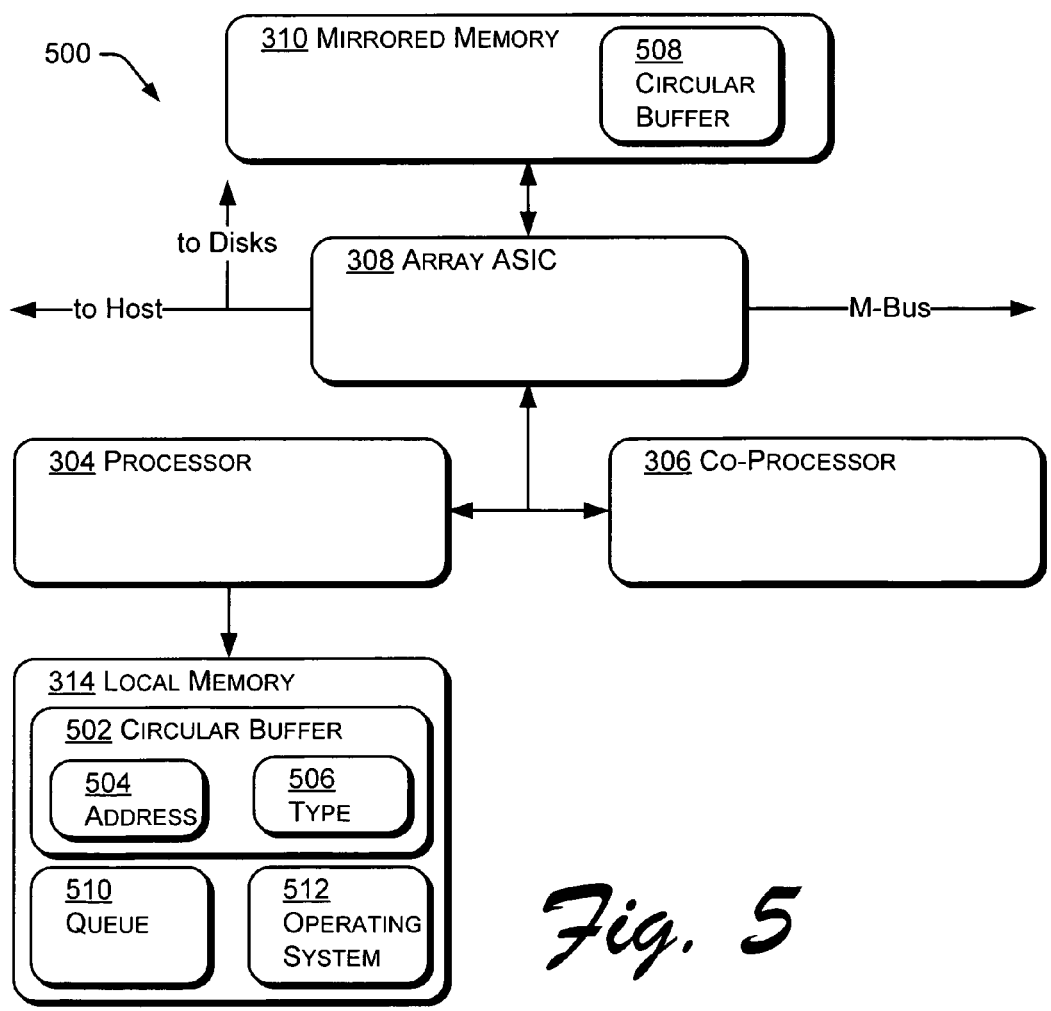
FIG. 5 is a diagram illustrating the relationship of key components on the controller card, and facilitating the discussion of the flow diagrams of FIGS. 6-8.

FIG. 5 illustrates the relationship of key components 500 on a single controller card, such as that of FIG. 3, with the addition of various software structures involved in the transfer of information between first and second controller cards. Within a RAID environment (such as that seen in FIG. 2) a plurality of controller cards communicate. In the course of the communication, information is transferred from a first processor, located on a first controller card, to a second processor, located on a second controller card, by an assist engine. The assist engine, comprising a coprocessor and mirrored memory on each controller card, relocates the information to a destination within a queue defined within memory local to the receiving processor. The operation of the assist engine includes first and second coprocessors, which cooperate to move information between controller cards by marshaling and de-marshaling information put into mirrored memory. Mirrored memory, as seen in FIGS. 2 and 3, is updated and maintained by an array ASIC 308.

The first processor 304 is configured to issue commands to the first coprocessor 306 using a circular buffer 502 defined in local memory 314. The coprocessor and mirrored memory form an assist engine, which transfers information within and between controller cards. The coprocessor supports two primary functions, i.e. sending and receiving information. The information sending functionality supports the receipt of commands from the processor, which may include an address pointer 504 and a command type 506. The command type instructs the coprocessor on how to marshal information associated, by the address pointer, with the command. Once marshaled, the coprocessor transfers the information to a circular buffer 508 located in mirrored memory 310.

Because the mirrored memory is mirrored by the array ASIC 308, the information written to one block of mirrored memory is available for viewing by coprocessors located on other controller cards within the RAID device looking at another block of mirrored memory. Accordingly, the receiving coprocessor, i.e. the coprocessor to which the information was directed, invokes its information receiving functionality and copies the information from mirrored memory. The receiving coprocessor then de-marshals the information, as appropriate, thereby forming a task for the consideration of the local processor. The task is placed in a queue 510 administered by the operating system 512 of the local processor. At intervals, dispatcher software within the operating system of the receiving processor takes work from the queue, for the attention of the local processor.

As seen above, a coprocessor 306 on a first controller card can communicate with similar coprocessor on a second controller card by passing information into mirrored memory 310, where it can be seen by a plurality of coprocessors. Alternatively, a first coprocessor 306 on a first controller card can communicate with a second coprocessor on a second controller card by passing information to array ASIC 308 on the first controller card. The information can then be passed over the M-Bus or similar facility to a second array ASIC on a second controller card. The second array ASIC can then pass the information to the second coprocessor. In this manner, coprocessors can communicate without the use of the mirrored memory.

Figure 6:
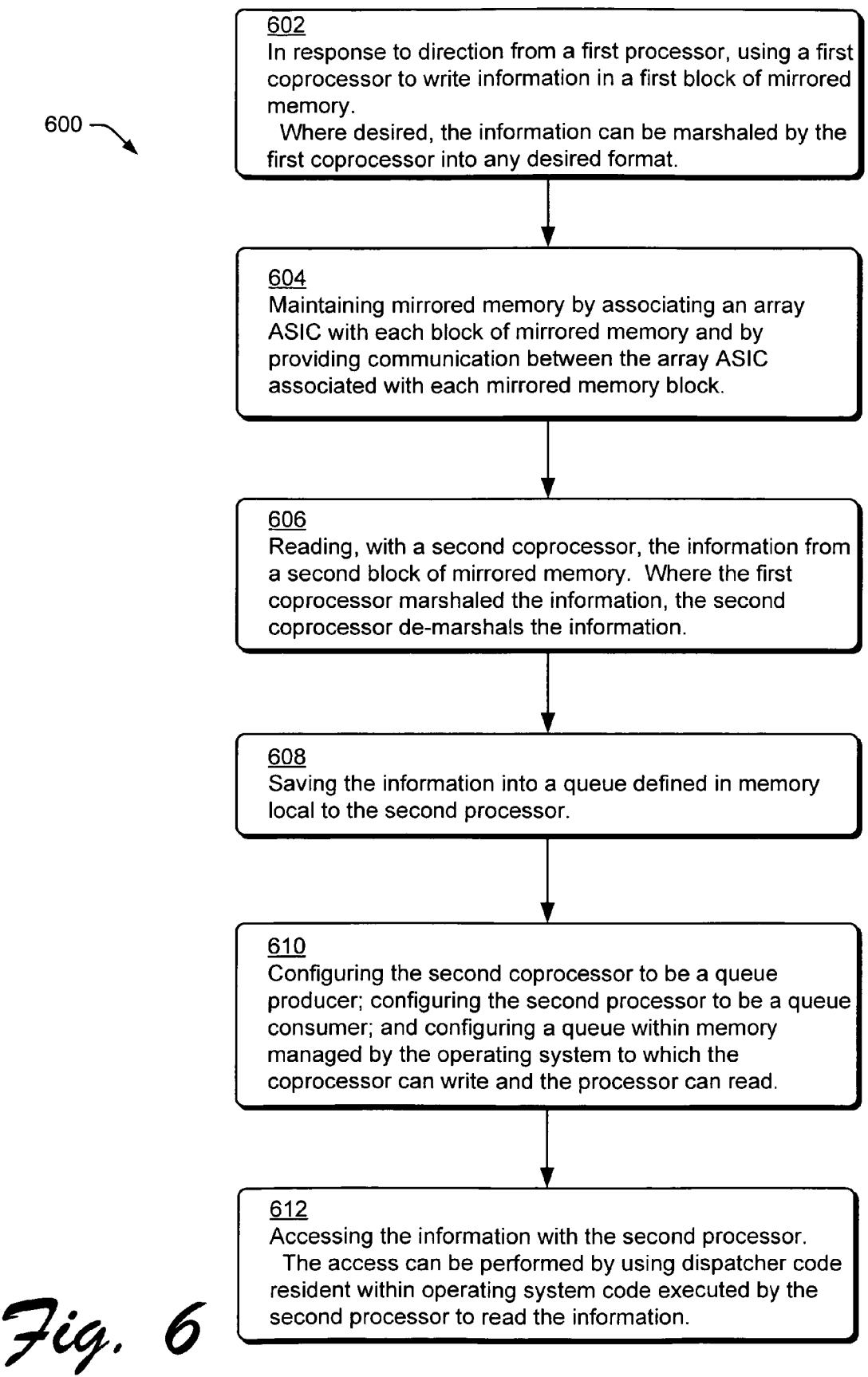
FIG. 6 is a flow diagram that describes a method to transfer information between a first processor and a second processor, wherein the first and second processors are located on first and second controller cards, respectively.

The flow chart of FIG. 6 illustrates a method 600 to transfer information between a first processor and a second processor, wherein the first and second processors are located on first and second controller cards within a RAID device, respectively. The elements of the method may be performed by any desired means, such as by the execution of processor-readable instructions defined on a processor-readable media, such as a disk, a ROM or other memory device. Also, actions described in any block may be performed in parallel with actions described in other blocks, may occur in an alternate order, or may be distributed with the actions associated with more than one other block.

At block 602, in response to direction from a first processor, a first coprocessor is used to write information in a first block of mirrored memory. In a typical application, the information includes a task to be performed by a second processor. Where desired, the information can be marshaled by the first coprocessor into any desired format. In many cases, the information is written into a circular buffer, constructed within the mirrored memory.

At block 604, mirrored memory is maintained by associating an array ASIC with each block of mirrored memory. Each array ASIC communicates with the array ASIC associated with other blocks of mirrored memory. Accordingly, when one block of mirrored memory is altered, the associated array ASIC propagates the change to other array ASICs, which in turn update their respective areas of mirrored memory.

At block 606, a second coprocessor reads the information from a second block of mirrored memory which has been updated by the associated array ASIC. Where the first coprocessor marshaled the information, the second coprocessor de-marshals the information.

At block 608, the information is saved into a queue defined in memory local to the second processor. The queue can be resident within or managed by the operating system of the second processor, such as a queue associated with the dispatcher code contained within the operating system 512 of FIG. 5.

At block 610, the second coprocessor is configured to be a queue producer, while the second processor is configured to be a queue consumer, and a queue is configured within memory managed by the operating system in such a manner as to allow the coprocessor write to the queue and to allow the processor to read from the queue.

At block 612, the information is accessed by the second processor. The accessing can be performed by using dispatcher code resident within operating system code executed by the second processor.

Figure 7:
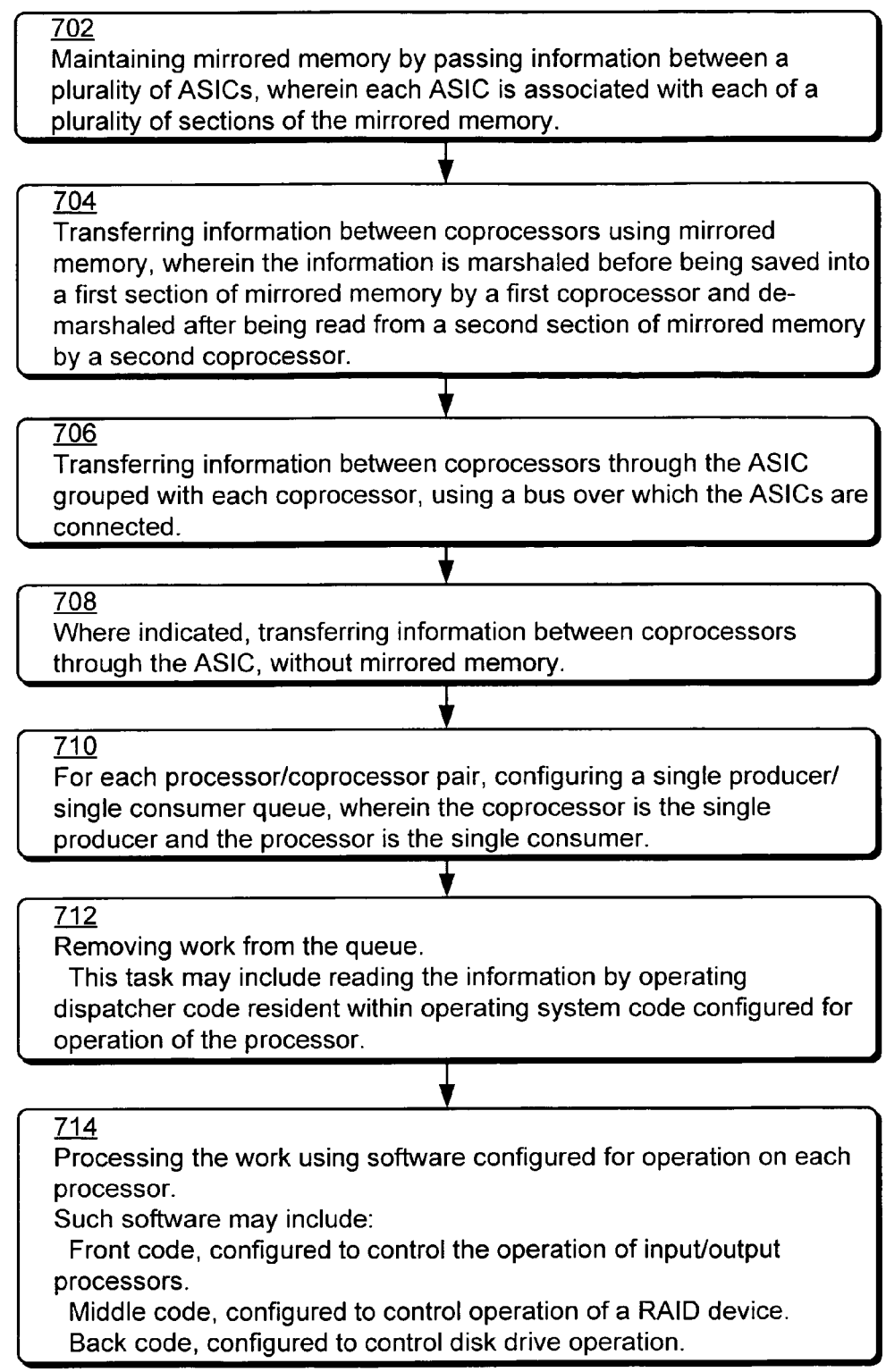
FIG. 7 is a flow diagram that describes a method by which a plurality of processor/coprocessor pairs can share work.

The flow chart of FIG. 7 illustrates a method 700 for configuring a plurality groups, each group containing a processor, a coprocessor and an ASIC, to share work. For example, FIG. 5 illustrates such a group, comprising a processor 304, coprocessor 306 and ASIC 308, which may be carried on a controller card 204, such as seen in FIGS. 2 and 3. The elements of the method may be performed by any desired means, such as by the execution of processor-readable instructions defined on a processor-readable media, such as a disk, a ROM or other memory device. Also, actions described in any block may be performed in parallel with actions described in other blocks, may occur in an alternate order, or may be distributed with the actions associated with more than one other block.

At block 702, mirrored memory is maintained, so that changes in one block of mirrored memory contained within one controller card are reflected in the blocks of mirrored memory contained within other controller cards within the RAID device. Mirrored memory is maintained by passing information between a plurality of array ASICs, wherein each array ASIC is associated with each of a plurality of sections of the mirrored memory. The array ASICs are thereby able to propagate changes made to one block of mirrored memory to all other blocks of mirrored memory.

At block 704, information is transferred between coprocessors using mirrored memory. Because information written to one block of mirrored memory is propagated to other blocks, each coprocessor is able to communicate with other coprocessors through mirrored memory. To better organize the communication, information may be marshaled before being saved into a first section of mirrored memory by a first coprocessor and de-marshaled after being read from a second section of mirrored memory by a second coprocessor.

At block 706, as an addition or an alternative to the method of transferring information between controller cards seen at blocks 702 and 704, information may be transferred between coprocessors through the ASIC with which each coprocessor is grouped, using a bus over which the ASICs are connected.

Accordingly, information, having passed between a coprocessor and the ASIC grouped with the coprocessor, may be transferred to a second ASIC and the coprocessor associated with the second ASIC using a bus over which the ASICs are connected. For example, in FIG. 5, it can be seen that communication can be established between the coprocessor 306 and ASIC 308. Since ASICs are able to communicate over the M-Bus, communication between coprocessors can be supported through the ASIC grouped with each coprocessor.

At block 708, where indicated, information may be transferred between coprocessors through the ASIC, without mirrored memory. As seen in the discussion of FIG. 5, to avoid the use of mirrored memory, a first coprocessor 306 can communicate with a second coprocessor by passing information to an array ASIC. The information is then passed over a bus to an array ASIC on a second controller card, and from there to the second coprocessor. This step may be useful where it is desired to avoid the use of mirrored memory.

At block 710, a single producer/single consumer queue is configured for processor/coprocessor pair. Within the queue, the coprocessor is the single producer, depositing work on the queue, and the processor is the single consumer, removing work from the queue. The queue is configured within memory local to the processor and to the coprocessor.

At block 712, work is removed from the queue. Work removal may be performed by dispatcher code, which is resident within the operating system code 512 configured for operation of the processor. The dispatcher code is executed at intervals, allowing for control over the job removal process.

At block 714, the work removed from the queue is processed using software configured for operation on each processor. Such software may be suited for a variety of different purposes. Examples of the software run by the processor in performing the tasks removed from the queue include: front code, configured to control the operation of input/output processors; middle code, configured to control operation of a RAID device; and back code, configured to control disk drive operation.

The flow chart of FIG. 8 illustrates a method 800 by which work may be shared between remotely located first and second processors, which is particularly adapted for use in a RAID environment. The elements of the method may be performed by any desired means, such as by the execution of processor-readable instructions defined on a processor-readable media, such as a disk, a ROM or other memory device. Also, actions described in any block may be performed in parallel with actions described in other blocks, may occur in an alternate order, or may be distributed with the actions associated with more than one other block.

At block 802, a command is issued from the first processor to a first coprocessor using a circular buffer defined in local memory. In one example, the command comprises an address and a command type.

At block 804, using the address and command type, the first coprocessor marshals information. In many applications, the information that is marshaled depends on the address, while the method by which it is marshaled depends on the command.

At block 806, the coprocessor copies marshaled information into mirrored memory. The copying process may include writing to a circular buffer configured within mirrored memory and de-allocating memory within the circular buffer after the remote coprocessor has read the de-marshalling job.

At block 808, a second coprocessor is notified that a de-marshalling job is available. Typically, notification comes from the first coprocessor.

At block 810, the second coprocessor reads the de-marshalling job from a second block of mirrored memory. Generally, the second block of mirrored memory is in a remote location, with respect to the first coprocessor.

At block 812, the second coprocessor performs the de-marshalling job, thereby obtaining de-marshaled information.

At block 814, the de-marshaled information associated with an available job is written to a queue. Once on the queue, the de-marshaled information becomes a task to be performed by the second processor on an available job. Writing the de-marshaled information may be performed by placing information into a queue, which is defined in local memory and is used by an operating system configured for operation by the second processor.

At block 816, the first processor is notified of progress on the command execution, typically only after command completion.

In conclusion, hardware assisted inter-processor communication allows transfer of information, such as instructions and data, between a first processor and a second processor. A first processor is configured to direct a coprocessor to write information in a first block of mirrored memory. Each block of mirrored memory is maintained by an associated ASIC, which is in communication with similarly situated ASICs. A second coprocessor reads the information from a second block of mirrored memory. The information is saved into a queue defined in memory local to a second processor.

Although the disclosure has been described in language specific to structural features and/or methodological steps, it is to be understood that the appended claims are not limited to the specific features or steps described. Rather, the specific features and steps are exemplary forms of implementing this disclosure. For example, in a one version of the invention, dispatcher code within the operating system of the remote processor is used to remove work from the queue. Alternatively, an external queue, located outside the operating system, could be constructed, and appropriate code designed to remove work from the external queue.

Additionally, while one or more methods have been disclosed by means of flow charts and text associated with the blocks, it is to be understood that the blocks do not necessarily have to be performed in the order in which they were presented, and that an alternative order may result in similar advantages.

The invention claimed is:

1. A method of performing hardware assisted communication between processors, comprising:

in response to direction from a first processor, using a first coprocessor to write information in a first block of mirrored memory;

maintaining mirrored memory;

reading, with a second coprocessor, the information from a second block of mirrored memory;

saving the information in memory accessible to a second processor; and accessing the information with the second processor, wherein accessing the information with the second processor comprises using dispatcher code resident within operating system code executed by the second processor.

2. The method of claim 1, additionally comprising marshalling the information with the first coprocessor.

3. The method of claim 1, additionally comprising de-marshalling the information with the second coprocessor.

4. The method of claim 1, additionally comprising:

configuring the second coprocessor to be a queue producer;

configuring the second processor to be a queue consumer; and configuring a queue to allow the second coprocessor to write to the queue and to allow the second processor to read from the queue.

5. A method of configuring a plurality of groups, each group containing a processor, a coprocessor and an ASIC (application specific inteqrated circuit), to share work, the method comprising:

transferring information between coprocessors through the ASIC with which each coprocessor is grouped, using a bus over which the ASICs are connected; for each group, configuring a single producer/single consumer queue, wherein the coprocessor is the single producer and the processor is the single consumer;

removing information from the single producer/single consumer queue, wherein accessing the information with the second processor comprises using dispatcher code resident within operating system code executed by the second processor; and processing the information using software configured for operation on each processor.

6. The method of claim 5, wherein removing information from the single producer/single consumer queue comprises:

maintaining mirrored memory by passing information between a plurality of ASICs, wherein each ASIC is associated with each of a plurality of sections of the mirrored memory; and transferring information between coprocessors using mirrored memory, wherein the information is marshaled before being saved into a first section of mirrored memory by a first coprocessor and de-marshaled after being read from a second section of mirrored memory by a second coprocessor.

7. The method of claim 5, wherein the software configured for operation on each processor is selected from among a group comprising:

front code, configured to control the operation of input/output processors;

middle code configured to control operation of a RAID device; and back code configured to control disk drive operation.

8. A processor-readable medium, comprising processor-executable instructions for transferring information between a first processor and a second processor, the processor-executable instructions comprising processor-executable instructions for:

in response to direction from the first processor, using a first coprocessor to write information in a first block of mirrored memory;

maintaining mirrored memory by associating an array ASIC with each block of mirrored memory and by providing communication between the array ASICs associated with each mirrored memory block;

reading, with a second coprocessor, the information from a second block of mirrored memory;

saving the information into a queue defined in memory local to the second processor; and accessing the information with the second processor.

9. The processor readable media of claim 8, additionally comprising processor-executable instructions for marshalling the information with the first coprocessor.

10. The processor readable media of claim 9, additionally comprising processor-executable instructions for de-marshalling the information with the second coprocessor.

11. The processor readable media of claim 8, wherein accessing the information with a second processor comprises additional processor-executable instructions for using dispatcher code resident within operating system code executed by the second processor to access the information.

12. The processor readable media of claim 8, additionally comprising processor-executable instructions for:

configuring the second coprocessor to be a queue producer;

configuring the second processor to be a queue consumer; and configuring the queue within memory managed by the operating system to which the coprocessor can write and the processor can read.

* * * * *

UNITED STATES PATENT AND TRADEMARK OFFICE
CERTIFICATE OF CORRECTION

| | |
|---|---|
| PATENT NO. | : 7,318,120 B2 |
| APPLICATION NO. | : 11/023091 |
| DATED | : January 8, 2008 |
| INVENTOR(S) | : Robert A. Rust et al. |

Page 1 of 1

It is certified that error appears in the above-identified patent and that said Letters Patent is hereby corrected as shown below:

In column 8, line 28, in Claim 5, delete "inteqrated" and insert -- integrated --, therefor.

Signed and Sealed this

Fifteenth Day of July, 2008

JON W. DUDAS
*Director of the United States Patent and Trademark Office*